(12) United States Patent
Lu et al.

(10) Patent No.: US 6,701,401 B1
(45) Date of Patent: Mar. 2, 2004

(54) METHOD FOR TESTING A USB PORT AND THE DEVICE FOR THE SAME

(75) Inventors: Ming Lu, Tianjin (CN); Tong S Chen, Taipei (TW); Kuang-Shin Lin, Taipei (TW)

(73) Assignee: Inventec Corporation, Taipei (TW)

(*) Notice: Subject to any disclaimer, the term of this patent is extended or adjusted under 35 U.S.C. 154(b) by 523 days.

(21) Appl. No.: 09/706,840

(22) Filed: Nov. 7, 2000

(51) Int. Cl.[7] .......................... G06F 13/14; G06F 13/20; G06F 15/177; G06F 11/00

(52) U.S. Cl. .......................... 710/305; 710/313; 713/1; 713/2; 714/38

(58) Field of Search .............................. 710/305, 313; 714/38; 713/1, 2

(56) References Cited

U.S. PATENT DOCUMENTS

| 6,205,502 B1 | * | 3/2001 | Endo et al. | 710/100 |
| 6,256,687 B1 | * | 7/2001 | Ellis et al. | 710/71 |
| 6,357,011 B2 | * | 3/2002 | Gilbert | 713/300 |
| 6,363,491 B1 | * | 3/2002 | Endo | 713/310 |
| 6,460,143 B1 | * | 10/2002 | Howard et al. | 713/323 |

* cited by examiner

*Primary Examiner*—Tim Vo
(74) *Attorney, Agent, or Firm*—Birch, Stewart, Kolasch & Birch, LLP

(57) ABSTRACT

A method for testing a USB port and the device for the same. The VCC and GND power lines of the USB port and the twisted paired signal lines of D+ and D− are connected with the corresponding terminals on a parallel port so as to test the connection between the USB port and the USB host controller. The invention also discloses the corresponding device.

12 Claims, 2 Drawing Sheets

METHOD FOR TESTING A USB PORT AND THE DEVICE FOR THE SAME

BACKGROUND OF THE INVENTION

1. Field of Invention

The present invention relates to a method for testing the connection between a USB port and a USB host controller through a simple circuit and the device for the same.

2. Related Art

The universal serial bus (USB) is a new generation peripheral interface, which is set forth by seven software and hardware companies, including Intel, Compaq, NEC, DEC (Digital), IBM, Northern Telecom, and Microsoft. The transmission speed of this interface can be either 1.5 Mbps or 12 Mbps. It can connect at most 127 peripheral devices. Since its transmission speed is much faster than a parallel port or a serial port used in a personal computer (PC), therefore the USB significantly increases the transmission efficiency between the computer and its peripheral devices.

The Windows 98 operating system supports the USB interface. It sets a unified specification for the peripheral communications port of a PC and supports almost all peripheral devices, such as the USB interface network card, keyboard, mouse, joystick, optical disk drive, tape drive, printer, scanner, digital camera, etc. These USB devices do not only support the plug-and-play function but also the hot-plug function.

Through the USB, peripheral devices of different types (such as the mouse, keyboard, joystick, speaker, modem, scanner, optical disk drive, etc) can be connected to a PC through the same interface, simplifying the PC interface type. Moreover, the USB has such advantages of a lower cost, more connections, occupying less system resources and supporting a plurality of transmission protocols (at most four different protocols).

The current test method is to plug a USB device (such as a USB mouse) to the USB port on a PC to check the connection of the USB port by testing the USB device. However, there are the following problems:

1. The test cost increases because it needs a USB device.
2. When the USB device does not function normally, it is impossible to determine whether it is because improper connection of the port or the USB device does not function correctly. This may leads to incorrect test conclusion.
3. When the condition in 2 happens, one needs to further check the function of the USB device in order to have a correct test result. This definitely lowers the efficiency of the tests.

SUMMARY OF THE INVENTION

It is a primary object of the present invention to provide a simple but effective test method to test the connection of a USB port on a personal computer main board. Using a simple hardware circuit to test the connection can avoid the complication of the current test methods and using a USB device. It can greatly save the cost and prevent incorrect judgments due to improper functioning of the USB device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The invention provides a simple method for testing a USB port and the device for the same. The USB port 201 is connected with a parallel port 202, as in FIG. 2.

Figure 2:
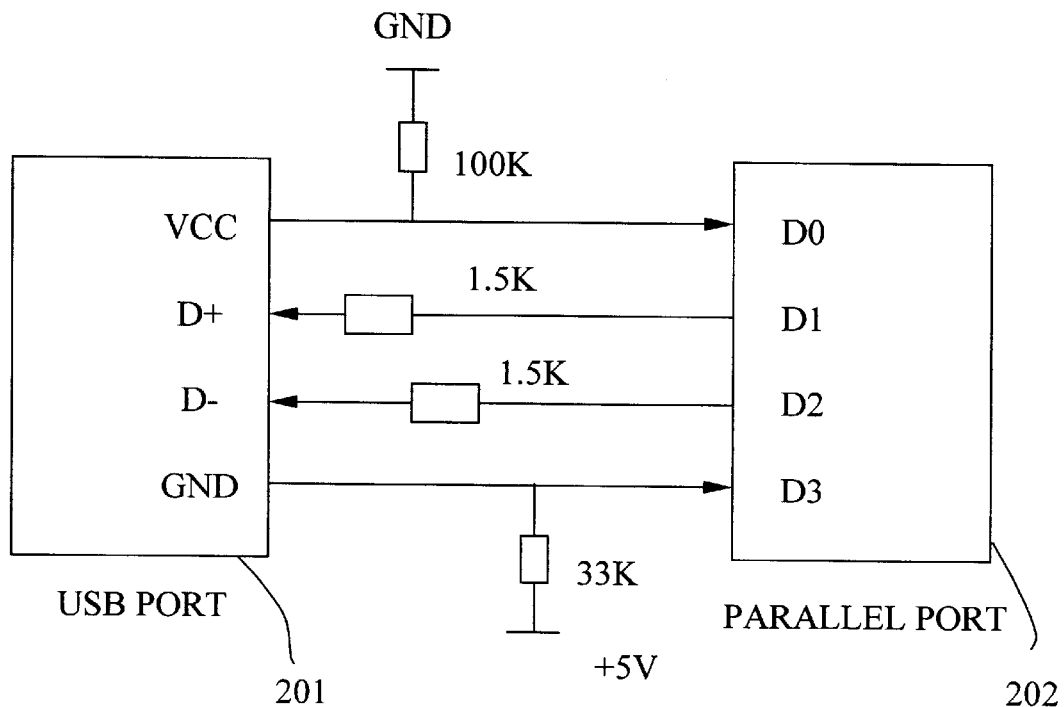
FIG. 2 is a schematic view of a test device that connects a USB port and a parallel port according to the invention.

The USB port has four lines, VCC, GND, D+ and D−. VCC and GND are power lines, D+ and D− are twisted paired signal lines. The port status/control register of a USB host controller contains a D+ line status and a D− line status. These two reflect the statuses of the two signal lines, D+ and D−, on the USB port. When the signal line connects to a high voltage, the corresponding location in the register is 1 or otherwise 0. When testing, the signal lines on the USB port and the corresponding terminals on the parallel port are connected (FIG. 2).

A preferred embodiment of the invention is described as follows. The four lines, VCC, D+, D− and GND, are connected to the pins, D0, D1, D2 and D3, on the parallel port, respectively. In particular, the VCC terminal is connected with a 100K pull-down resistor, the GND terminal is connected with a 33K pull-up resistor, a 1.5K resistor is connected between the D+ terminal and the D1 terminal, a 1.5K resistor is connected between the D− terminal and the D2 terminal (FIG. 2). The pull-down and pull-up resistors are mainly for establishing different voltages to generate connection and disconnection signals. The data lines are kept at a default voltage when not being driven.

Figure 1:
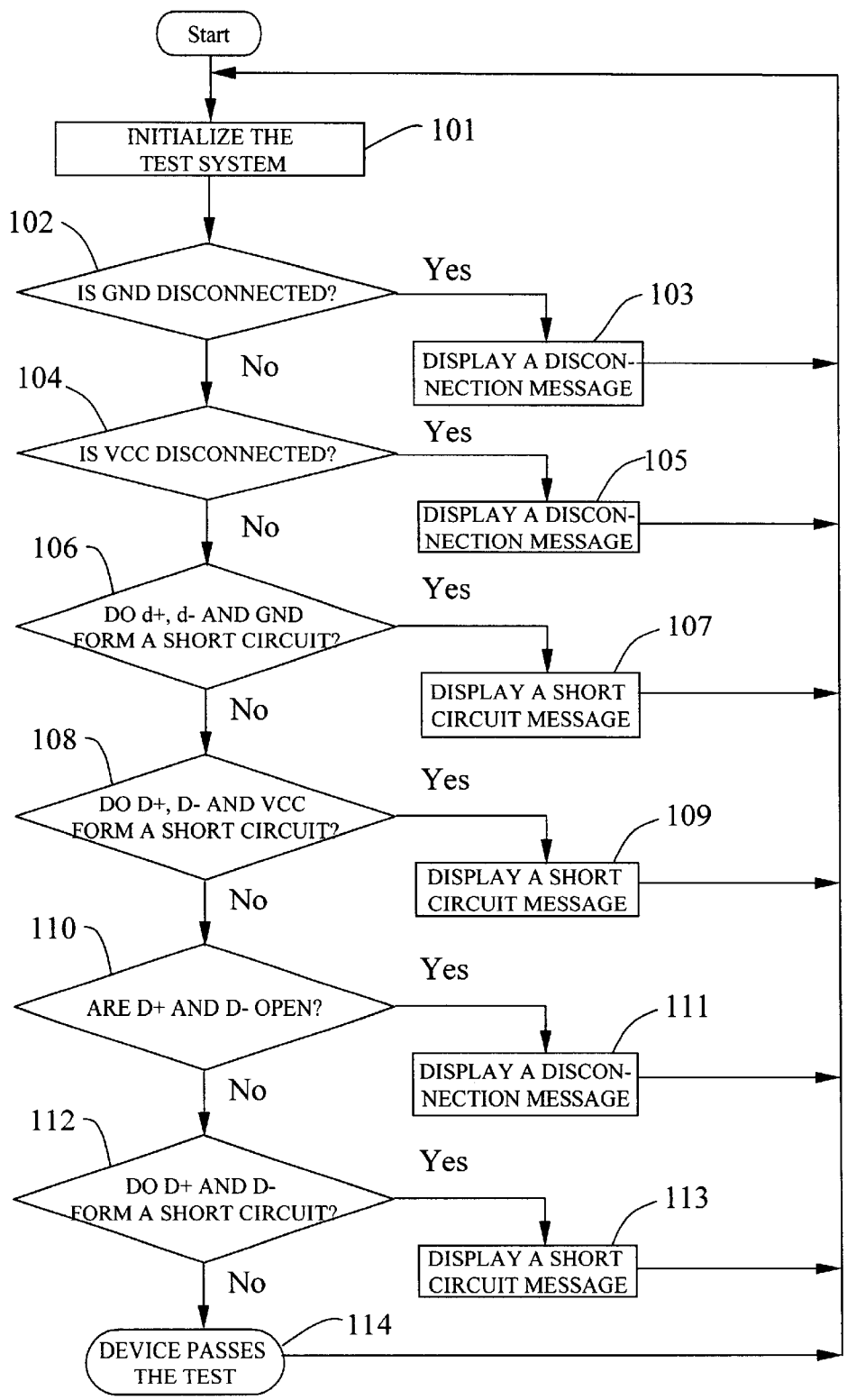
FIG. 1 is a working flow chart of the disclosed method for testing a USB port according to the present invention.

The flow of the disclosed method for testing a USB port is shown in FIG. 1.

First, the test system is initialized (step 101). This process mainly tests whether a USB host controller exists, reads the I/O base address of the USB host controller and initializes a parallel port.

The method then checks whether the GND signal line is disconnected (step 102). Both D1 and D2 on the parallel port are set at high voltages and the potential of D3 of the parallel port is measured. If the potential is at a high voltage, then the GND of the USB port is disconnected, and a disconnection message will be displayed (step 103) and the procedure returns back to the step 101. Otherwise, GND is not disconnected and other tests follow.

The method then checks whether the VCC signal line is disconnected. The D1 and D2 of the parallel port are set at low voltages and the potential of D0 of the parallel port is measured. If the potential is at a low voltage, then the VCC is disconnected, and a disconnection message will be displayed (step 105) and the procedure returns back to the step 101. Otherwise, VCC is not disconnected and other tests follow.

Step 106 tests whether D+ and D− form a short circuit with GND. D1 and D2 of the parallel port are set at high voltages. The USB host controller reads the statuses of D+ and D−. If one of them is at a low voltage, then the potential and GND form a short circuit. A short circuit message is displayed (step 107) and the procedure returns back to step 101. If both of them are at high voltages, then no short circuit occurs and other tests follow.

Step 108 tests whether D+ and D− form a short circuit with VCC. D1 and D2 of the parallel port are set at low voltages. The USB host controller reads the statuses of D+ and D−. If one or both of them are at high voltages, then the potential and VCC form a short circuit. A short circuit message is displayed (step 109) and the procedure returns back to step 101. If one or both of them are at low voltages, then no short circuit occurs and other tests follow.

Step 110 checks whether D+ and D− are disconnected. D1 and D2 of the parallel port are both set first at low voltages and then at low voltages. The D+ and D− potentials in the USB host controller are measured simultaneously. If one or both of the potentials do not show such a change, then they are disconnected. A disconnection message is displayed (step 111) and the procedure returns back to step 101. If such a change is detected in one or both of the potentials, then there is no disconnection and other tests follow. Step 112 checks whether D+ and D− form a short circuit. D1 and D2 of the parallel port are set at a high voltage and a low voltage, respectively. The D+ and D− potentials in the USB host controller are measured. If they have the same status, then D+ and D− are short. A short circuit message is displayed (step 113) and the procedure returns back to step 101. Otherwise, the system displays a successful test (step 114) and returns back to the initial test.

If there is no short circuit message throughout the above-described series of tests, then the USB port is functioning normally. The system goes on testing the next USB port.

The present invention provides a simple but effective method for testing the connection of a USB port. This method avoids such drawbacks as higher costs in conventional test methods. The hardware employed is more reliable and the corresponding software is simpler.

Figure 3:
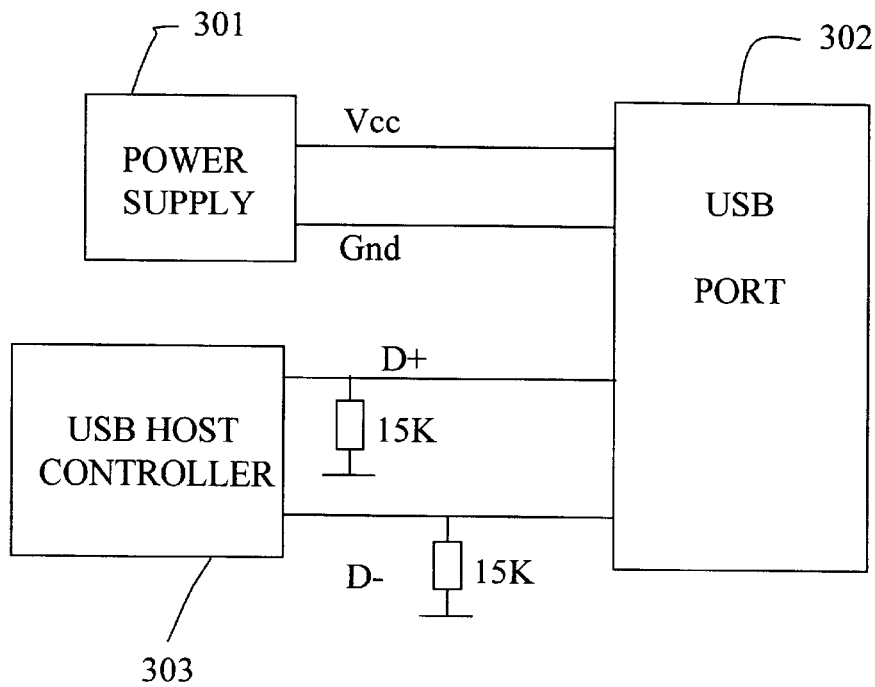
FIG. 3 is a schematic view of a USB port connection.

FIG. 3 is a schematic view of a USB port connection. The power supply 301 couples to the USB port through VCC and GND. The USB host controller 303 couples to the USB port through D+ and D−.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for testing a USB port, which comprises the steps of:

reading in an I/O base address of a USB host controller;

initializing a parallel port;

testing whether the GND signal is disconnected by setting the D1 and D2 pins of the parallel at high voltages and measuring the D3 pin of the parallel port;

testing whether the VCC signal is disconnected by setting the D1 and D2 pins of the parallel at low voltages and measuring the D0 pin of the parallel port;

testing whether the D+ and D− form a short circuit with GND by setting the D1 and D2 pins of the parallel port at high voltages and reading the statuses of the D+ and D− from the USB host controller;

testing whether D+ and D− form a short circuit with VCC by setting the D1 and D2 pins of the parallel port at low voltages and reading the statuses of the D+ and D− from the USB host controller;

testing whether D+ and D− are disconnected by setting the D1 and D2 pins of the parallel port at low voltages and then at high voltages and reading the statuses of the D+ and D− from the USB host controller;

testing whether D+ and D− form a short circuit by setting the D1 and D2 pins of the parallel port first at high voltages and then at low voltages and reading the statuses of the D+ and D− from the USB host controller; and displaying the test result.

2. The method of claim 1, wherein the D+ and D− are twist paired signal lines of the USB port.

3. The method of claim 1, wherein the VCC and the GND are the power lines of the USB port.

4. The method of claim 1, wherein the step of testing whether the GND signal is disconnected further comprises the step of displaying a disconnection message for the GND of the USB port when the D3 pin is at a high voltage.

5. The method of claim 1, wherein the step of testing whether the VCC signal is disconnected further comprises the step of displaying a disconnection message for the VCC of the USB port when the D0 pin is at a low voltage.

6. The method of claim 1, wherein the step of testing whether D+ and D− form a short circuit with GND further comprises the step of displaying a short circuit message for the D+ and the GND when the D+ pin is at a low voltage.

7. The method of claim 1, wherein the step of testing whether D+ and D− form a short circuit with GND further comprises the step of displaying a short circuit message for the D− and the GND when the D− pin is at a low voltage.

8. The method of claim 1, wherein the step of testing whether D+ and D− form a short circuit with VCC further comprises the step of displaying a short circuit message for the D+ and the VCC when the D+ pin is at a high voltage.

9. The method of claim 1, wherein the step of testing whether D+ and D− form a short circuit with VCC further comprises the step of displaying a short circuit message for the D= and the VCC when the D− pin is at a high voltage.

10. The method of claim 1, wherein the step of testing whether the D+ and the D− are disconnected further comprises the step of displaying a disconnection message for the D+ when the D+ does not detect any change in the D1 and D2 pins.

11. The method of claim 1, wherein the step of testing whether the D+ and the D− are disconnected further comprises the step of displaying a disconnection message for the D− when the D− does not detect any change in the D1 and D2 pins.

12. The method of claim 1, wherein the step of testing whether the D+ and the D− form a short circuit further comprises the step of displaying a short circuit message for the D+ and the D− when the D+ and the D− are in the same status.

* * * * *